(12) United States Patent
Brignac

(10) Patent No.: US 7,828,493 B1
(45) Date of Patent: Nov. 9, 2010

(54) ARTIFICIAL REEF STRUCTURE

(76) Inventor: Charles Brignac, 209 Industrial Trace, Broussard, LA (US) 70518

(*) Notice: Subject to any disclaimer, the term of this patent is extended or adjusted under 35 U.S.C. 154(b) by 0 days.

(21) Appl. No.: 12/328,857

(22) Filed: Dec. 5, 2008

(51) Int. Cl.
*A01K 61/00* (2006.01)
(52) U.S. Cl. ............... 405/24; 119/221; 119/238
(58) Field of Classification Search ............ 405/21, 405/24, 26–29; 119/221, 238, 711, 174
See application file for complete search history.

(56) References Cited

U.S. PATENT DOCUMENTS

| | | | | |
|---|---|---|---|---|
| 2,319,170 | A | * | 5/1943 | Toner .................. 119/238 |
| 3,517,912 | A | | 6/1970 | Foley |
| 4,712,944 | A | * | 12/1987 | Rose .................. 405/26 |
| 4,727,672 | A | | 3/1988 | Hill |
| 5,564,369 | A | | 10/1996 | Barber |
| 5,700,108 | A | * | 12/1997 | Bishop et al. ........... 405/26 |
| 5,865,147 | A | * | 2/1999 | Rubin .................. 119/711 |
| 2002/0168229 | A1 | | 11/2002 | Utter |
| 2004/0168649 | A1 | | 9/2004 | Harper et al. |
| 2004/0235371 | A1 | | 11/2004 | Bosse |
| 2007/0124995 | A1 | | 6/2007 | Kania |

FOREIGN PATENT DOCUMENTS

WO    WO 0049859 A1 *  8/2000

* cited by examiner

*Primary Examiner*—Sunil Singh

(57) ABSTRACT

An artificial reef device comprising an axle rod supporting a plurality of buoyant reef bodies rotatably mounted on the axle rod. The axle rod and buoyant sections are suspended at a desired level above a water bottom by anchors attached to anchor lines further attached to the axle rod. A plurality of distally projecting rods is mounted on the buoyant reef bodies. The distally projecting rods are mounted in a manner such that the buoyant reef bodies rotate independently of each other on the axle rod without interference from the distally projecting rods. Some of the projecting rods may be hollow to receive soluble fish attractant for disbursement through the hollow rods.

9 Claims, 3 Drawing Sheets

ARTIFICIAL REEF STRUCTURE

FIELD

The present invention general relates to field of providing artificial reefs for attracting fish and more particularly to an apparatus for placing an artificial reef structure at a desired depth for use in lakes and ponds.

SUMMARY OF INVENTION

Applicant provides an improved artificial reef device for placing and maintaining the reef structure at a desired depth. The reef device is intended for use in small lakes and ponds and in particular manmade lakes and ponds where natural fish attracting structure such as trees, stumps, and brush have been removed during the construction of the lake or pond. However, the device may also be used in natural lakes, ponds, and rivers, and other water reef bodies to provide fish attracting reef structure.

The artificial reef device is comprised of a plurality of buoyant reef bodies rotatably attached to an elongated rod which serves as an axle upon which the buoyant reef bodies rotate. One or more elongated rods with rotating buoyant reef bodies may be attached together to form the artificial reef. The elongated axle rod or rods are attached to an anchor by means of a line or lines of desired lengths so that the reef device is positioned at a desired depth in a body of water.

Each of the buoyant reef bodies on the elongated axle rod rotates independent of each of the other buoyant reef bodies. Each of the buoyant reef bodies may have a plurality of elongate rods projecting outward distally from each of the buoyant reef bodies. The projecting rods of each of the buoyant reef bodies may be arranged so that the projecting rods of one of the buoyant reef bodies do not interfere with the projecting rods of any of the other buoyant reef bodies as the buoyant reef bodies are rotated on the elongated axle rod. The projecting rods are utilized to provide additional fish attracting structure to proposed reef structure.

The projecting rods of each of the buoyant reef bodies may be threaded at one end for connection to the buoyant reef bodies by means of a correspondingly threaded bore provided in each of the buoyant reef bodies. The projecting rods may also be connected to the buoyant reef bodies by frictional fit of the projecting rod into a corresponding bore provided in the buoyant reef bodies.

The elongated axle rod that supports the buoyant reef bodies of the artificial reef may be connected to a length of anchor line or lines of a desired length. These lines may be attached to anchors or other tie down devices. Adjusting the length of the anchor lines will allow the artificial reef device to be suspended at a desired depth from the surface of the water body in which it is to be used.

When a line or lure is presented during fishing it is likely that a line or lure will become snagged or caught on one of the buoyant reef bodies or the projecting rods. Because the buoyant bodes rotate on the elongated axle rod, pulling on a snagged line or lure will rotate the snagged buoyant body on the elongated axle rod so that a snagged line or lure may be freed from its engagement with the buoyant body or a projecting rod. These rotating buoyant reef bodies will minimize the risk of lost fishing tackle and encourage fishermen to place their lures directly within the confines of the artificial reef device, a location more likely to hold attracted fish. Because the buoyant reef bodies are configured to rotate independently of each other, the disturbance to or frightening of the fish gathered around the device will be minimized.

At least one of the projecting rods attached to the buoyant reef bodies may be hollow and provided with a plurality of holes or apertures through the outer surface of the hollow projecting rods. A threaded or frictional cap may be provided at the end of the hollow projecting rod distal from the buoyant section. Fish food or a fish attractant may be placed in the hollow rod and then the rod may be capped. Water seeping into the hollow rod through the holes in its outer surface will dissolve the fish food or attractant and exude fish attracting smells or food particles to attract minnows or other small baitfish to the artificial reef. The presence of such small baitfish attracted by the exuding fish attractant will augment the fish attracting capabilities of the artificial reef device.

It is thought that the buoyant reef bodies may be made of any buoyant material such wood, plastics, Styrofoam, or any suitable polymer or copolymer. The buoyant reef bodies may be hollow or otherwise constructed to maintain their buoyancy. The projecting rods may be formed of any suitable material including wood, plastics, PVC, or any suitable polymer or copolymer. A light non-corrosive metal such as aluminum material might also be utilized.

Alternatively, the elongated axle rod may be buoyant and configured to support either buoyant or non-buoyant reef bodies; each of the reef bodies may have projecting rods. The buoyant elongated axle rod may be connected to a length of anchor line or lines of a desired length. These lines may be attached to anchors or other tie down devices. Adjusting the length of the anchor lines will allow the artificial reef device to be suspended at a desired depth from the surface of the water body in which it is to be used.

DESCRIPTION OF EMBODIMENT

Figure 1:
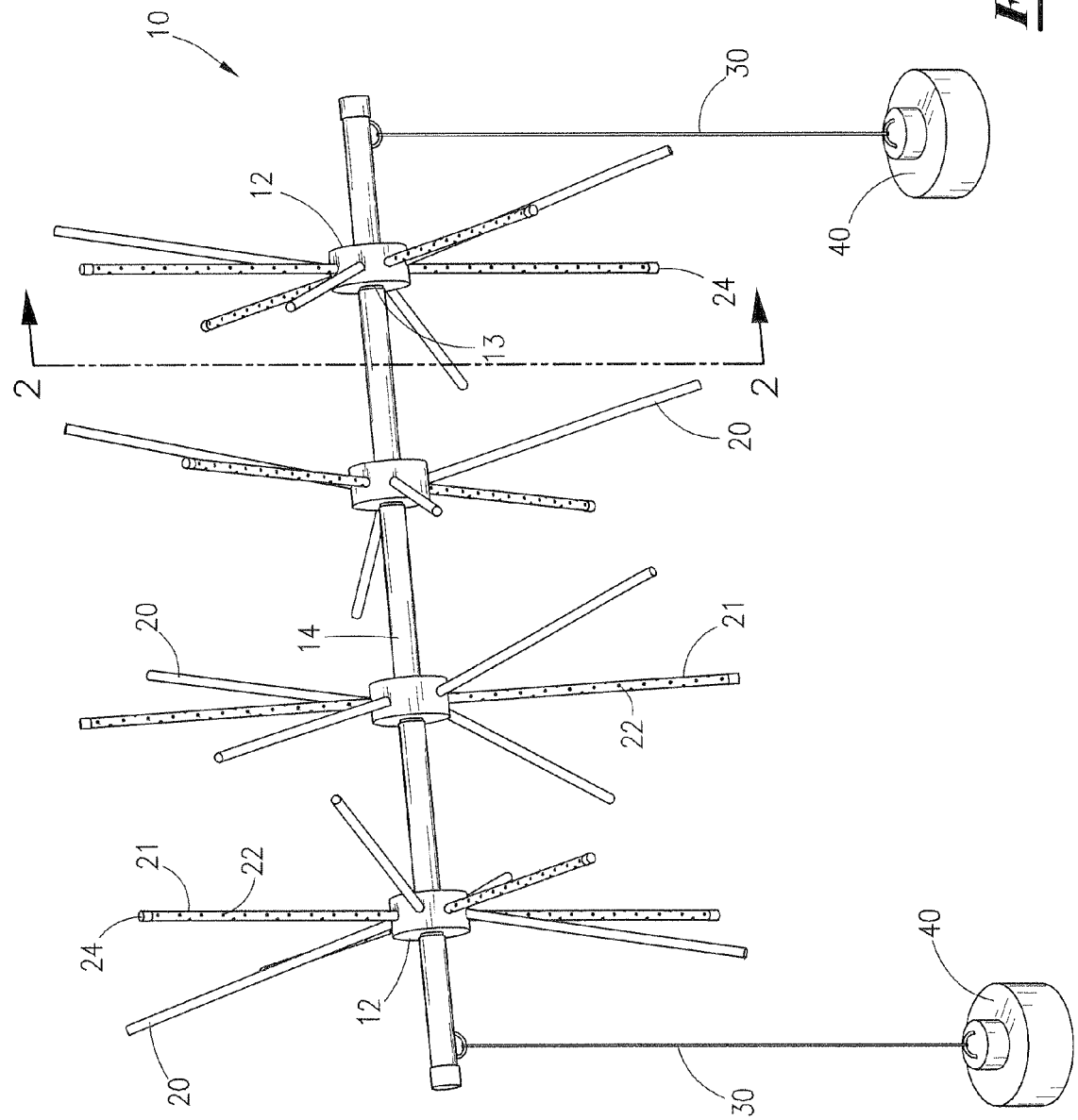
FIG. 1 is a is a perspective view of the artificial reef device incorporating the features of the invention.
Figure 2:
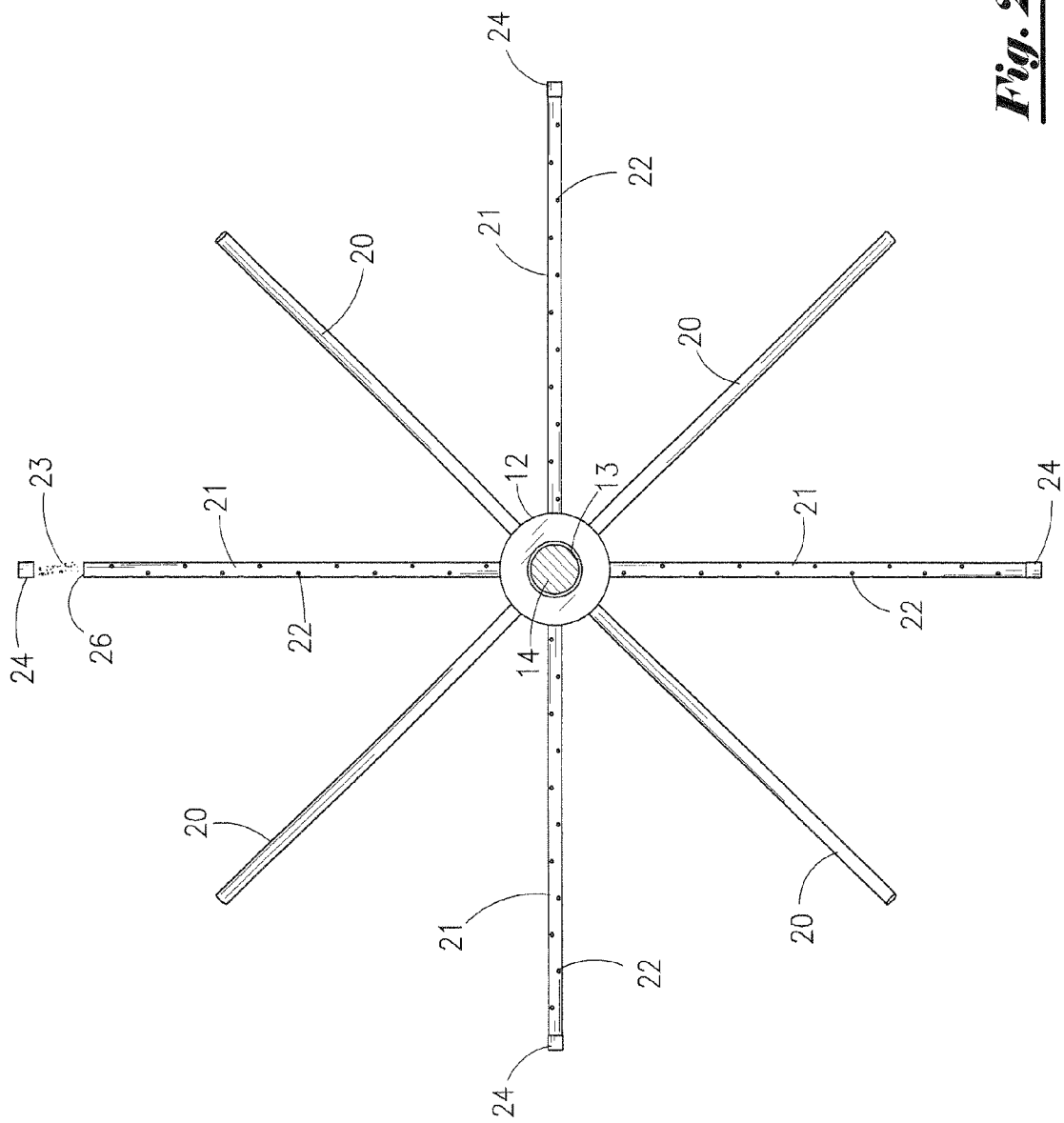
FIG. 2 is a partial cross-sectional view of the axle and buoyant sections shown in FIG. 1.
Figure 3:
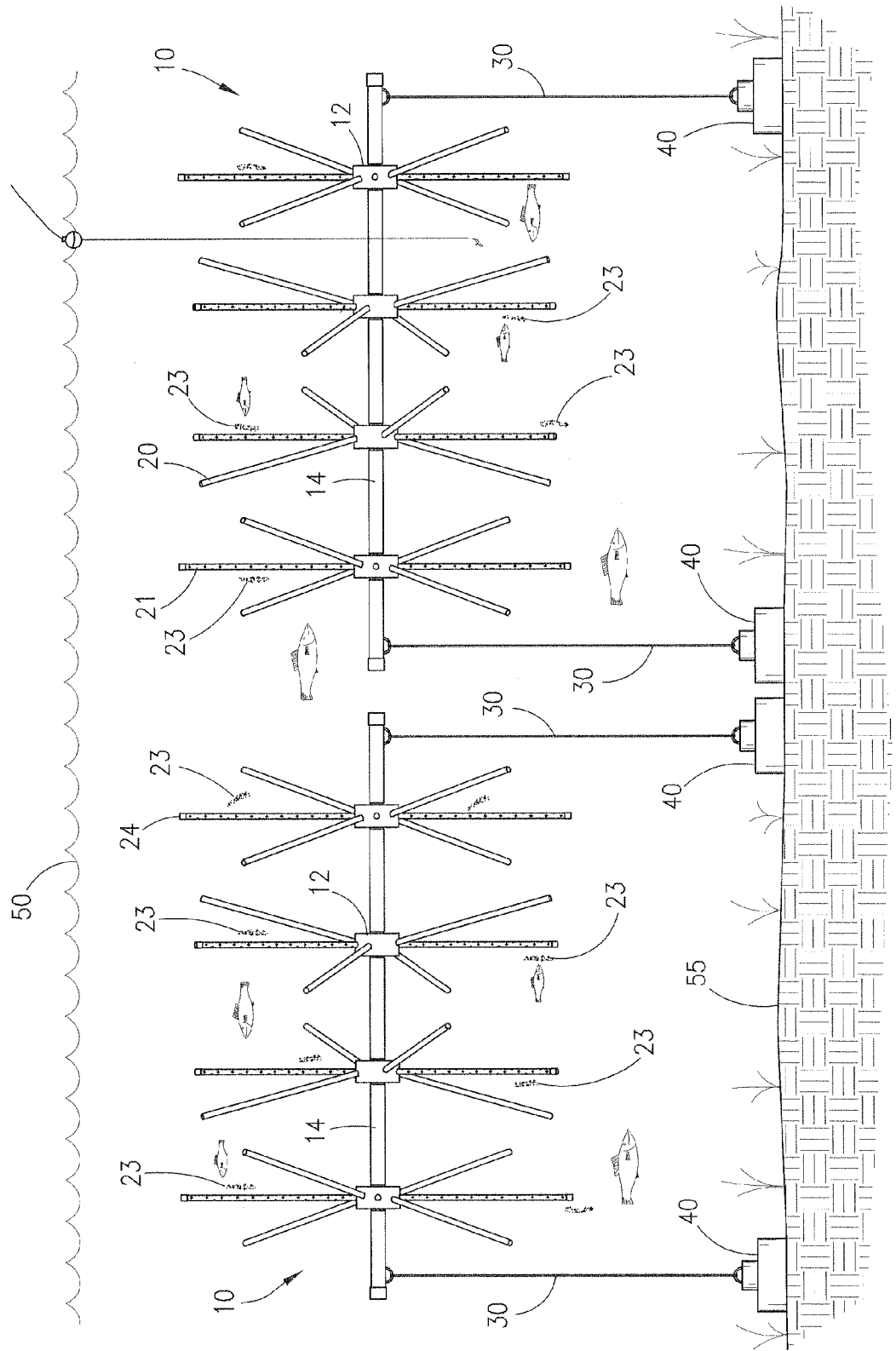
FIG. 3 is an elevation view of the artificial reef device of FIG. 1 suspended in place in a water body.

FIGS. 1 through 3 show an embodiment of the improved artificial reef device (10) of applicant's invention. The device (10) is comprised of at least one buoyant body (12) but preferably a plurality of buoyant reef bodies (12). The buoyant reef bodies (12) are rotatably mounted on an elongated axle rod (14). The axle rods (14) of multiple reef devices (10) may be attached longitudinally together to form an elongated artificial reef.

Each buoyant body (12) has a center bore (13) which receives the elongated axle rods (14) and which allows rotation of each buoyant body (12) on the axle rod (14). Any desired number of buoyant reef bodies (12) may be positioned on the axle rod (14). As shown, multiple axle rods (14) with the rotatably buoyant reef bodies (12) may be strung together to form the reef (10).

The reef (10) may be suspended at a desired depth in a water body by means of anchor lines (30). Each of the anchor lines (30) is of a desired length and each has one of its ends attached to an elongated axle rod (14) and its other end attached to an anchor (40). Adjusting the length of the anchor lines (30) will allow the artificial reef device (10) to be suspended by the buoyant reef bodies (12) at a desired depth from the surface of the water body in which it is to be used. While the buoyant reef bodies (12) are show as doughnut shaped round sections, the reef bodies (12) may be any desirable shape including paraboloidal, pyramided, cubic, or quadrate.

A plurality of elongate projecting rods (20) may be connected to each buoyant body (12) so that the rods (20) project outward distally from each buoyant body (12). The projecting rods (20) provide fish attracting structure for the artificial reef device (10). The rods (20) may be of different lengths.

At least one of the projecting rods (20) may be a hollow rod (21) and the rod (21) may be provided with a plurality of holes or apertures (22) extending longitudinally along and around its outer surface. A threaded or frictional cap (24) may be provided at the end of the hollow rod (26) distal from the corresponding buoyant body (12). Soluble fish food or fish attractant (23) may be placed in the hollow rod (21) and then the rod (21) may be capped with cap (24). Water seeping into a hollow rod (21) through the holes (22) will dissolve the fish food or fish attractant (23). Dry dog food may be used as a fish attractant. Oil, scent, or food particles from the fish attractant (23) will be disbursed from the holes (22) as the fish food or attractant (23) is dissolved to attract minnows or other small baitfish to the artificial reef device (10). The presence of such small baitfish attracted by the exuding fish attractant (23) will augment the fish attracting capabilities of the projecting rods (20) of the artificial reef device (10).

FIG. 3 shows the improved artificial reef device (10) in place in a body of water. The device (10) is suspended at a desired depth below the surface (50) of a water body. The device (10) is suspended at a desired depth by buoyant reef bodies (12) on the axle rods (14) by means of attached anchor lines (30) of a desired length which are further attached to anchors (40) at the bottom (55) of the water body. The projecting rods (20, 21) provide cover structure to attract fish to the reef device (10). Oil, scent, or food particles from soluble fish food or attractant (23) placed in a rod (21) will be disbursed from the holes (22) as the fish food or attractant (23) is dissolved to attract minnows or other small baitfish to the artificial reef device (10).

The length of anchor lines (30) may be adjusted, longer or shorter, to allow the device (10) to be suspended at a desired water depth. The ability to suspend the device (10) at a desired depth will allow the using to adapt the reef to varying water and temperature conditions that might be experienced. This feature will be particularly useful when the device (10) is used in small farm ponds are lakes where water depths may vary depending upon drought or seasonal conditions.

The buoyant reef bodies (12) of the reef device (10) may be made of any buoyant material such wood, plastics, Styrofoam, or any suitable polymer or copolymer. The buoyant sections (12) may be hollow or substantially hollow, or otherwise constructed to maintain their buoyancy. The projecting rods (12) and the axle rods (14) may be formed of any suitable material including wood, plastics, PVC, or any suitable polymer or copolymer. A light non-corrosive metal such as aluminum or aluminum alloy might also be utilized. The buoyant reef bodies (12) may be any desirable shape including semispherical sections, paraboloidal sections, pyramided sections, cubic sections, or quadrate sections.

If snagged by a fishing line, lure or associated terminal tackle is snagged on a buoyant body (12) or rod (20, 21); the snagged buoyant body (12) will rotate on axle rod (14) to assist in freeing the snagged line, lure or terminal tackle. The independent rotation of a snagged buoyant body (12) from the other buoyant reef bodies (12) will facilitate the release of any lures, lines, or terminal tackle from the reef device (10) while minimizing the disturbance to the water and any fish near or around the reef device (10).

Alternatively, the elongated axle rod (14) may be buoyant and configured to buoyantly support either buoyant or non-buoyant reef bodies (12). Each of the reef bodies (12), whether buoyant or non-buoyant, may have projecting rods (20, 21) as previously described. The buoyant elongated axle rod (14) may be constructed of a length of hollow pipe, such as PVC pipe, that is capped at each end to create an air space for buoyancy. The buoyant elongated axle rod (14) may be connected to a length of anchor line or lines (30) of a desired length. These lines may be attached to anchors (40) or other tie down devices. Adjusting the length of the anchor lines (30) will allow the artificial reef device to be suspended at a desired depth from the surface of the water body in which it is to be used.

It is thought that the improved artificial reef device and method of the present invention and many of its attendant advantages will be understood from the foregoing description and it will be apparent that various changes may be make in the form, construction and arrangement of the parts thereof without departing from the spirit and scope of the invention or sacrificing all of its material advantages, the form described herein being merely an exemplary embodiment of the invention.

I claim:

1. An artificial reef device comprising:
   (a) an axle rod;
   (b) two anchor lines attached to axle rod;
   (c) a plurality of buoyant bodies rotatably mounted on said axle rod, each of said buoyant bodies having a plurality of rods projecting distally outward from each of said buoyant bodies; and
   (d) an anchor attached to each of said anchor lines, whereby said buoyant bodies and said axle rod is suspended on said anchor lines at a desired depth in a body of water.

2. The artificial reef device recited in claim 1 wherein each of said buoyant bodies has a bore for receiving said axle rod whereby said buoyant bodies rotate on said axle rod.

3. The artificial reef device of claim 1 wherein at least one of said rods projecting from said buoyant bodies is hollow, said projecting hollow rod having a plurality of holes providing a plurality of openings through the outer surface of said hollow rod.

4. The artificial reef device of claim 3 wherein said hollow rod has a cap at its end distal from said buoyant bodies.

5. The artificial reef device of claim 4 wherein soluble fish attractant is placed in said hollow rod.

6. The artificial reef device of claim 5 wherein the length of said anchor lines is adjustable.

7. The artificial reef device of claim 6 wherein said plurality of distally projecting rods are mounted to said buoyant bodies in a manner such that said buoyant bodies rotate independently of each other on said axle rod without interference with said distally projecting rods.

8. The artificial reef device of claim 7 wherein two of said axle rods with said plurality of rotatably mounted buoyant bodies are longitudinally linked together.

9. The artificial reef device of claim 7 wherein said buoyant bodies are doughnut shaped.

* * * * *